(No Model.)
2 Sheets—Sheet 1.

G. W. PARSONS.
BAND CUTTER AND FEEDER.

No. 549,584. Patented Nov. 12, 1895.

Witnesses:
W. J. Dankey,
R. H. Orwig.

Inventor: George W. Parsons,
By Thomas G. and J. Ralph Orwig, Attys.

(No Model.) 2 Sheets—Sheet 2.
G. W. PARSONS.
BAND CUTTER AND FEEDER.
No. 549,584. Patented Nov. 12, 1895.
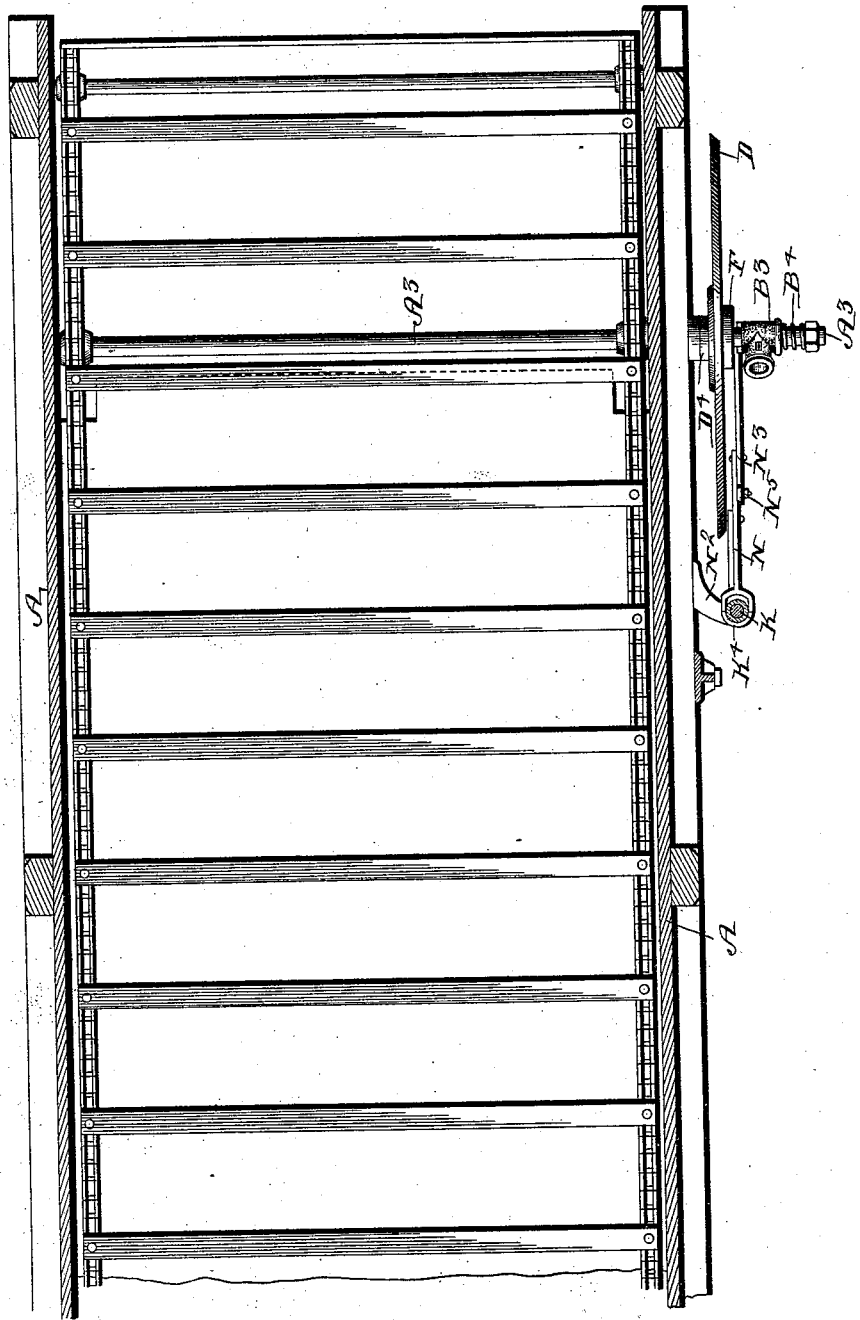
Witnesses:
W. J. Dankey,
Reuben O. Orwig.
Inventor: George W. Parsons,
By Thomas G. and J. Ralph Orwig,
Attorneys

UNITED STATES PATENT OFFICE.

GEORGE W. PARSONS, OF NEWTON, IOWA, ASSIGNOR OF THREE-FOURTHS TO W. C. BERGMAN, A. H. BERGMAN, AND FRED L. MAYTAG, OF SAME PLACE.

BAND-CUTTER AND FEEDER.

SPECIFICATION forming part of Letters Patent No. 549,584, dated November 12, 1895.

Application filed January 19, 1895. Serial No. 535,439. (No model.)

*To all whom it may concern:*

Be it known that I, GEORGE W. PARSONS, a citizen of the United States, residing at Newton, in the county of Jasper and State of Iowa, have invented certain new and useful Improvements in Band-Cutters and Feeders for Thrashing-Machines, of which the following is a specification.

My invention relates to that class of band-cutters and feeders that are adapted to be connected with a thrashing-machine and be driven by power derived therefrom; and it consists in an improvement upon a band-cutter and feeder invented by me and for which an application for United States Letters Patent was filed November 17, 1894, Serial No. 529,091.

My present object is to provide improved, simplified, and cheapened means for throwing the band-cutting and feeding mechanism out of gear, so as to stop the device from feeding grain to the thrashing-cylinder when the speed of rotation falls below the proper thrashing speed, so that no grain is fed when there is not sufficient speed to properly thrash the same and so that as the machine is being stopped the feed will stop first and the grain therein run through before the thrashing-machine be stopped.

My invention consists in the construction and arrangement of the means for throwing the friction-wheel out of engagement with its shaft that drives the feeding mechanism and in the combination therewith of a ball-governor and a lever connected with the governor to operate the shaft-engaging mechanism on the said friction-wheel, as hereinafter set forth, pointed out in my claims, and illustrated in the accompanying drawings, in which—

Figure 1:
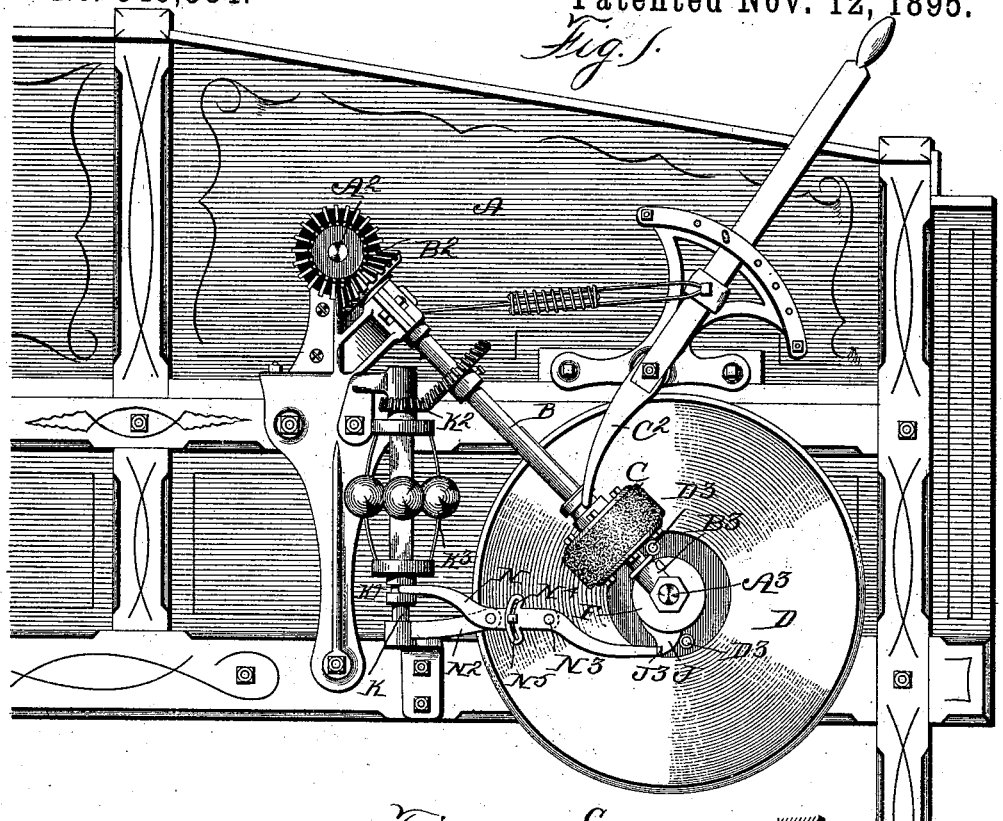
Figures 2, 3:
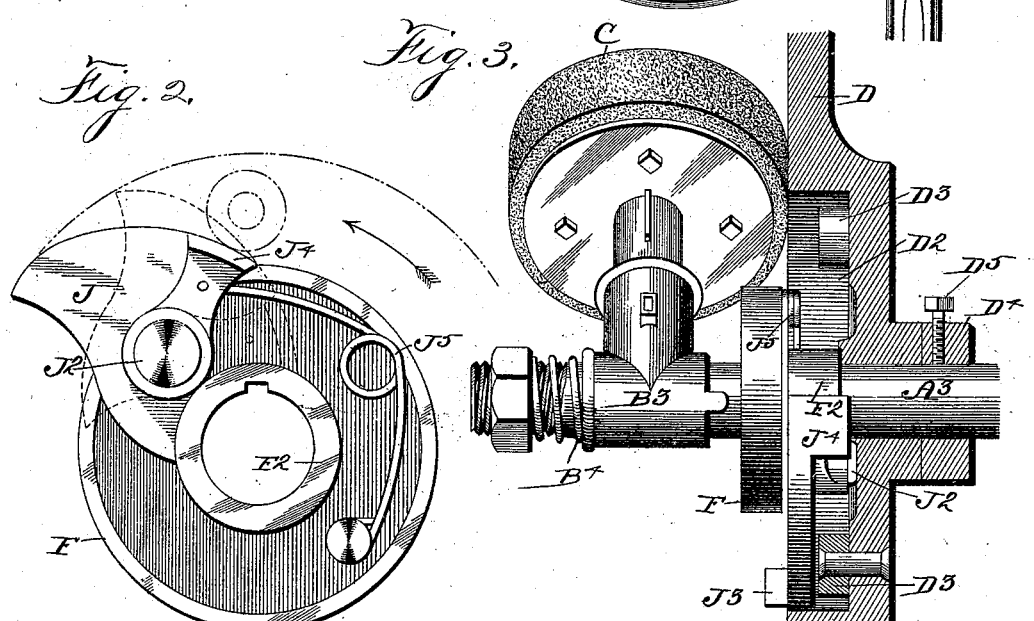

Figure 1 is a side elevation of a part of the band-cutter and feeder, showing the device applied thereto. Fig. 2 is a view of the under side of the device to be fixed to the shaft of the feeding mechanism to engage the friction-wheel. Fig. 3 is a detail view, partly in section, showing the driving friction-wheel and the driven wheel in engagement and the mechanism for securing the driven friction-wheel to its shaft. Fig. 4 is a plan view of the forward end of the machine to illustrate the connection of the feeding device with the speed-regulator.

Referring to the accompanying drawings, the reference-letter A is used to indicate the frame of the band-cutter and feeder; $A^2$, the shaft to which power is applied from the thrashing-machine; $A^3$, the shaft to which the feeding mechanism is attached.

B indicates a shaft mounted in suitable bearings on the side of the machine-frame, geared to the shaft $A^2$ at its upper end by means of the bevel-gears $B^2$.

$B^3$ indicates a T-joint slidingly mounted on the end of the shaft $A^3$ and having the lower end of the shaft B rotatably mounted therein. $B^4$ indicates a coil-spring in the outer end of the shaft $A^3$ normally pressing said T-joint inwardly.

C indicates a small brush-wheel slidingly but non-rotatably mounted on the shaft B and adapted to be moved longitudinally thereon by the lever $C^2$.

D indicates a brush-wheel of large diameter loosely mounted on the shaft $A^3$ and having a circular recess $D^2$ in its central portion and two antifriction-rollers $D^3$, connected with the brush-wheel and located at diametrically-opposite sides of the recess $D^2$. $D^4$ indicates a collar fixed to the shaft $A^3$ by means of a set-screw $D^5$ to prevent the said wheel from moving inwardly thereon.

F indicates a disk keyed to the shaft $A^3$ and having an inwardly-projecting collar $F^2$.

J indicates a trip device pivotally connected to the under face of the disk F by the pin $J^2$. Its one end is adapted to project outwardly beyond the edge of the disk and its other to rest against the collar $F^2$ to prevent the trip device from moving farther outwardly, but allowing it an unlimited inward movement. $J^3$ indicates a lug projecting laterally from the outer end of the trip device, and $J^4$ a lug projecting inwardly from said trip device to engage the rollers $D^3$ when said trip device is extended outwardly from its shaft and pass between the rollers and the shaft when the trip device is moved inwardly, as indicated by dotted lines in Fig. 2, thus permitting the wheel D to rotate independently of the trip device. J⁵ indicates a spring fixed to the disk F to normally hold the trip device J outwardly. It will now be obvious that as the large brush-wheel is rotated the lug $J^4$ will be engaged by one of the antifriction-rollers $D^3$ and rotate said disk F, together with the shaft $A^3$. It will be seen, also, that when the lug $J^3$ is engaged by a fixed object the said trip device will be forced inwardly against the pressure of its spring and the lug $J^4$ on its under surface passed between the rollers $D^3$ and the shaft $A^3$, thus permitting the disk to rotate while the shaft is held stationary.

K indicates a shaft mounted in suitable bearings in the side of the machine-frame and geared to the shaft B by means of the bevel gear-wheels $K^2$. Mounted on this shaft is a centrifugal ball-governor $K^3$, of common form, carrying an annularly-grooved collar $K^4$ on its lower end arranged to be elevated when the speed of rotation increases beyond a certain predetermined rate.

N indicates a lever fulcrumed to a support $N^2$, having one end resting in the groove in the collar $K^4$ and its other end adapted to engage the lug $J^4$ when the governor is at rest or moving slowly and be lowered out of engagement therewith when the said governor is rotated at "thrashing speed." When said lug on the trip device is engaged by the lever, it is forced to the position indicated by dotted lines and the large brush-wheel permitted to rotate independently of the trip device; but when said lever is lowered by the governor said trip device is thrown outwardly by its spring and engaged by the rollers on the large brush-wheel to rotate the feeding mechanism therewith. This lever N is jointed at $N^3$ and the overlapping part slotted at $N^4$, with a set-screw $N^5$ passed through said slot into the other part, whereby the lever may be made to engage the trip device at varying elevations of the annular collar $K^3$.

In practical operation the shaft $A^2$ and the band-cutting mechanism thereon, the shaft B, both brush-wheels, and the governor are constantly rotated during the operation of the thrashing-machine. When the speed is at or above the required number of revolutions to properly thrash the grain, the lever N is out of engagement with the trip device and rollers $D^3$ on the large friction-wheel engage the trip device and thus rotate the shaft $A^3$ of the feeding mechanism in unison therewith, and as the speed drops below thrashing speed the lever N engages the trip device and holds it stationary, together with the shaft $A^3$, to which it is keyed, permitting the large friction-wheel to rotate freely.

I claim as my invention—

1. In a band cutter and feeder for thrashing machines, the combination of a shaft mounted therein to operate the feeding mechanism, a wheel loosely mounted thereon, and having a lateral projection near its central portion, means for driving said wheel by power derived from the thrashing machine, a disk fixed to said shaft in juxtaposition to the said wheel, a spring-actuated trip device, substantially as described, pivoted to said disk, and having a lug thereon, adapted to normally engage said projection on the wheel, a ball governor, adapted to be operated by power derived from the thrashing machine, and a lever connected therewith, and adapted to engage said trip device, and hold it out of engagement with the projection on the wheel, when the rotation thereof falls below a certain predetermined speed, for the purposes stated.

2. In a band cutter and feeder for thrashing machines, the combination of a shaft mounted therein, to operate the feeding mechanism, a wheel loosely mounted thereon, and having a lateral projection near its central portion, means for driving said wheel by power derived from the thrashing machine, a disk fixed to said shaft, in juxtaposition to the said wheel, a spring-actuated trip device, substantially as described, pivoted to said disk, and having a lug thereon adapted to normally engage said projection on the wheel, a ball governor, adapted to be operated by power derived from the thrashing machine, a lever connected therewith and adapted to engage said trip device and hold it out of engagement with the projection on the wheel, when the rotation thereof, falls below certain predetermined speed, a joint in said lever and means for adjusting its outer end relative to its inner end, for the purposes stated.

3. In a band cutter and feeder the combination of a suitable frame, a shaft mounted therein, to operate the band cutting mechanism, and adapted to be driven from the thrashing machine, a second shaft therein, to operate the feeding mechanism, a shaft mounted on the side of the machine frame, geared to the first shaft, a brush wheel feathered to its other end, a second brush wheel, rotatably mounted on said feeding-shaft, normally in engagement with the first, one or more anti friction rollers, on said large wheel, a disk fixed to the feeding shaft, in juxtaposition to the brush wheel, a spring actuated trip device, as shown and described, on said disk, to normally engage one of said anti friction rollers, a centrifugal ball governor, geared to the first mentioned shaft, and carrying an annularly grooved collar, a lever fulcrumed to the machine frame, having one end in said annular groove, and its other normally in engagement with the said trip device, and having a joint in its central portion, and means for adjusting the outer end of the lever, relative to the other end, for the purposes stated.

GEORGE W. PARSONS.

Witnesses:
W. O. McELROY,
D. D. COTTRELL.